US010350555B2

(12) United States Patent
Nelson et al.

(10) Patent No.: US 10,350,555 B2
(45) Date of Patent: Jul. 16, 2019

(54) METHOD AND SYSTEM FOR MIXING ADHESIVES ON A SCALE AND/OR HYDRAULIC PLATFORM

(71) Applicant: FORCE FLOW, Concord, CA (US)

(72) Inventors: Mark Nelson, Orinda, CA (US); Michael Donn, Concord, CA (US); Randall Mann, Pi, CA (US)

(73) Assignee: FORCE FLOW, Concord, CA (US)

( * ) Notice: Subject to any disclaimer, the term of this patent is extended or adjusted under 35 U.S.C. 154(b) by 323 days.

(21) Appl. No.: 15/068,920

(22) Filed: Mar. 14, 2016

(65) Prior Publication Data

US 2016/0263536 A1 Sep. 15, 2016

Related U.S. Application Data

(60) Provisional application No. 62/133,040, filed on Mar. 13, 2015.

(51) Int. Cl.

| | |
|---|---|
| ***B01F 3/10*** | (2006.01) |
| ***B01F 3/08*** | (2006.01) |
| ***B01F 15/00*** | (2006.01) |
| ***C09J 9/00*** | (2006.01) |
| ***B01F 5/02*** | (2006.01) |
| ***B01F 5/06*** | (2006.01) |
| ***B01F 5/10*** | (2006.01) |

(52) U.S. Cl.
CPC .......... *B01F 3/0865* (2013.01); *B01F 5/0212* (2013.01); *B01F 5/0615* (2013.01); *B01F 5/102* (2013.01); *B01F 15/00194* (2013.01); *B01F 2003/0896* (2013.01); *B01F 2215/006* (2013.01)

(58) Field of Classification Search
CPC ........ B01F 2215/006; B01F 2003/0896; B01F 15/00194; B01F 15/00428; B01F 5/102; B01F 5/0206; C09J 7/32; G05D 11/04; G05D 7/0682
USPC .................................................. 366/136, 141
See application file for complete search history.

(56) References Cited

U.S. PATENT DOCUMENTS 4,863,277 A * 9/1989 Neal .................... B01F 3/1271 366/136
5,052,486 A * 10/1991 Wilson .................. B01F 3/0861 166/308.4

* cited by examiner

*Primary Examiner* — Tony G Soohoo
*Assistant Examiner* — Elizabeth Insler
(74) *Attorney, Agent, or Firm* — Buchanan Ingersoll & Rooney PC

(57) ABSTRACT

A system and method are disclosed for diluting an adhesive, the system includes a dilution tank of known capacity, the dilution tank located upon a scale, the scale being capable of generating a series of signals related to the weight of the dilution tank when empty and at various levels of fill; a spray nozzle configured to feed water into the dilution tank from a source of water; a mixing assembly, the mixing assembly including a manifold arrangement having a first inlet configured to receive an adhesive from a source of adhesive and a second inlet configured to receive a mixture of the water and the adhesive received from a lower portion of the dilution tank; a static mixer; and an eductor; and a system controller for generating a target concentration of a diluted adhesive; and controlling the input of water and adhesive into the mixing assembly and dilution tank.

11 Claims, 2 Drawing Sheets

METHOD AND SYSTEM FOR MIXING ADHESIVES ON A SCALE AND/OR HYDRAULIC PLATFORM

CROSS-REFERENCES TO RELATED APPLICATIONS

This application claims priority to U.S. Provisional Patent Application Ser. No. 62/133,040, filed on Mar. 13, 2015, the entire content of which is incorporated herein by reference

TECHNICAL FIELD

This invention relates to a method and system for mixing adhesives on a scale and/or hydraulic platform, and more particularly to a method and system for mixing, blending and/or diluting a food grade adhesive for the tissue and paper towel industry.

BACKGROUND

An adhesive is generally a substance applied to the surfaces of materials that binds them together and resists separation. For example, the term "adhesive" can be used interchangeably with glue, cement, mucilage, or paste.

Aquence Lam 5137, also known as Adhesin Lam 5137, is a liquid adhesive, which can be mixed with water to form a food grade laminate for tissues and paper towels. Since adhesive can require an extensive amount of blending due to their properties, it would be desirable to have a simple and effective method of mixing the adhesive with water to form a paste or glue.

SUMMARY OF THE INVENTION

In accordance with an exemplary embodiment, a method and system are disclosed for mixing, blending and/or diluting an adhesive, for example, for the tissue and towel industry.

In accordance with an exemplary embodiment, a system is disclosed for diluting an adhesive, the system comprising: a dilution tank of known capacity, the dilution tank located upon a scale, the scale being capable of generating a series of signals related to the weight of the dilution tank when empty and at various levels of fill; a spray nozzle configured to feed water into the dilution tank from a source of water; a mixing assembly, the mixing assembly comprising: a manifold arrangement having a first inlet configured to receive an adhesive from a source of adhesive, a second inlet configured to receive a mixture of the water and the adhesive received from a lower portion of the dilution tank, and a first outlet; a static mixer; and an eductor; and a system controller, wherein the system controller performs the following steps: inputting into the system controller the series of signals from the scale relating to the weight of the dilution tank when empty and at various levels of fill with water and adhesive; inputting into the system controller a target concentration of a diluted adhesive; and controlling the input of water and adhesive into the mixing assembly and dilution tank.

In accordance with an exemplary embodiment, a method for diluting an adhesive, the method comprising: generating a series of signals related to the weight of a dilution tank when empty and at various levels of fill, the dilution tank being of a known capacity and located upon a scale; inputting into a system controller the series of signals from the scale relating to the weight of the dilution tank when empty and at various levels of fill with water and adhesive; inputting into the system controller a target concentration of a diluted adhesive; feeding water into the dilution tank from a source of water through a spray nozzle; feeding an adhesive into a mixing assembly, the mixing assembly comprising: a manifold arrangement having a first inlet configured to receive the adhesive from a source of adhesive, a second inlet configured to receive a mixture of the water and the adhesive received from a lower portion of the dilution tank, and a first outlet; a static mixer configured to receive from the first outlet and mix the adhesive and the mixture of water and the adhesive from the lower portion of the dilution tank; and an eductor configured to eject the mixture of the adhesive and the mixture of water and adhesive into the lower portion of the dilution tank; and mixing the water and adhesive until the target concentration is reached.

DETAILED DESCRIPTION

The system and the method of its use will be described in the context of an adhesive, or glue, for example, for use in the tissue and power towel industry. However, it can be appreciated that the system and methods as disclosed are not limiting and the system and method can be used for a variety of mixing, blending, and/or diluting adhesives and other similar liquid materials.

Figure 1:
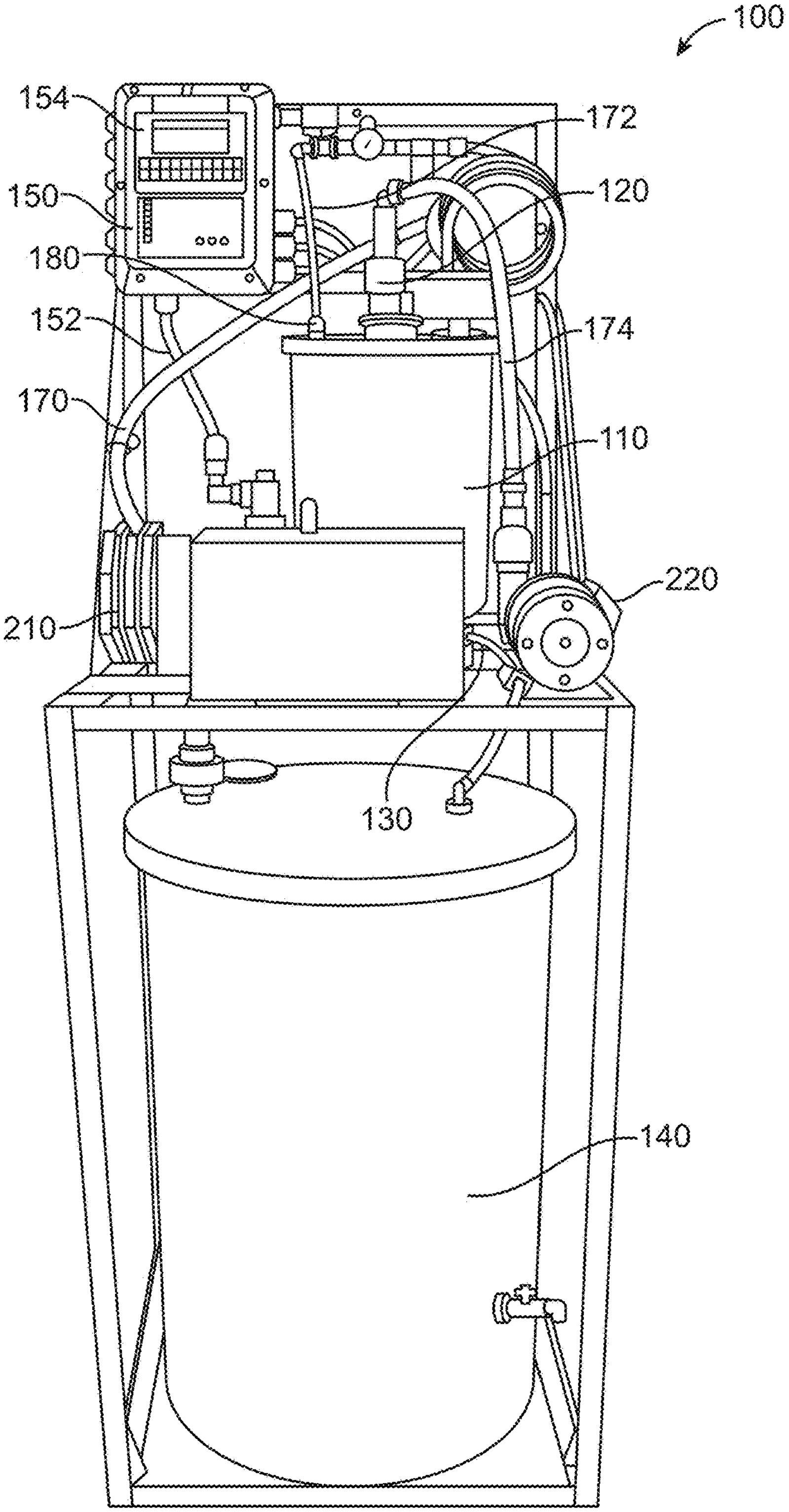
FIG. 1 is a perspective view of a system for mixing, blending, and/or diluting an adhesive in accordance with an exemplary embodiment.

FIG. 1 shows an exemplary embodiment of system 100 for mixing an adhesive. The system 100 can include a dilution tank (or mixing tank) 110, a mixing assembly 120, a scale 130, and a feed tank 140. In accordance with an exemplary embodiment, a source of water (not shown) and a source 190 (FIG. 2) of an adhesive 190 are each fed through a tubing arrangement 170, 172 to the mixing assembly 120, which extends into a lower interior portion of the dilution tank 110. The system 100 also includes a system controller 150, a spray nozzle 180 configured to spray water into the dilution tank 110, an adhesive pump (or neat adhesive pump) 210, and a mixing pump 220.

In accordance with an exemplary embodiment, the spray nozzle 180 feeds in the form of a spray, water from a source of water into the dilution tank 110. The adhesive pump 210 pumps a neat adhesive (adhesive that has not yet been mixed with water) into the dilution tank 110 at a flow rate, which can be controlled by the neat adhesive pump 210. The mixing pump 220 is configured to draw a mixture of water and adhesive ("adhesive mixture") from a lower portion of the dilution tank 110 through a tubing arrangement 174, and feeds the adhesive mixture into an upper portion of the mixing assembly 120, where the adhesive mixture is combined with neat adhesive as disclosed herein.

In accordance with an exemplary embodiment, the dilution tank 110, which can be a tote or drum, preferably has a known capacity, and in accordance with an exemplary embodiment is preferably supported on and/or mounted upon the scale 130. In accordance with an exemplary embodiment, the scale 130 is capable of generating a series of signals related to the weight of the dilution tank 110 when empty and at various levels of fill. In accordance with an exemplary embodiment, the scale 130 is preferably an electronic scale.

The dilution tank 110 is preferably a vertical tank designed to hold a mixture of water and adhesive. In accordance with an exemplary embodiment, the adhesive can be a food grade quality adhesive, which can be used in the tissue and paper towel industry. The type of tank 110 is not limiting and the system and methods according to this invention can be used with a variety of tanks, drums, and/or totes. In addition, as indicated above, the system 100 is not limited to the mixing, blending and diluting of food grade adhesives, and the system can work with a wide variety of applications wherein a mixture, a blend and/or a dilution of one or more liquids is performed.

As shown in FIG. 1, the dilution tank 110 is supported on an electronic scale 130 in the form of a platform or chemical scale, which generates a series of electronic signals, which are transmitted to the system controller 150 via the controller line 152. The electronic signals an include information related to the empty weight, full weight and partially full weight of the dilution tank 110. The moveable electronic scale 130 can include a platform member configured to support the dilution tank 110. In accordance with an exemplary embodiment, an electronic load cell or hydraulic cell (not shown) generates the electronic signal, which is a function of the variable quantity of water and adhesive in the dilution tank 110.

As shown in FIG. 1, the system and methods as described herein can be extended to an any suitable scale 130, which can include electronic scales, hydraulic scales and/or an ultrasonic level sensor, which each produces a signal, which is sent to the system controller 150 via line 152.

In accordance with an exemplary embodiment, the system controller 150 receives the electrical signal and converts the electrical signal via a microprocessor (or computer processing unit (CPU)) to a displayable user interface or digital display 154. The system controller 150 preferably includes a microprocessor, memories, and relays. In accordance with an exemplary embodiment, the microprocessor converts the electrical signal into a displayable signal indicative of an amount of dilution tank 110. An integrated time clock within the system controller 150 can calculate feed rates of water and adhesive into the dilution tank 110 and production data.

In accordance with an exemplary embodiment, the feed tank 140 is configured to receive diluted adhesive from the dilution tank 110 once the water and adhesive has been mixed to a desired consistency, which can be determined by the system controller 150. The feed tank 140 can be a vertical tank, which is designed to hold food grade adhesives. In accordance with an exemplary embodiment, the feed tank 140 is preferably a tote or drum having a known capacity.

Figure 2:
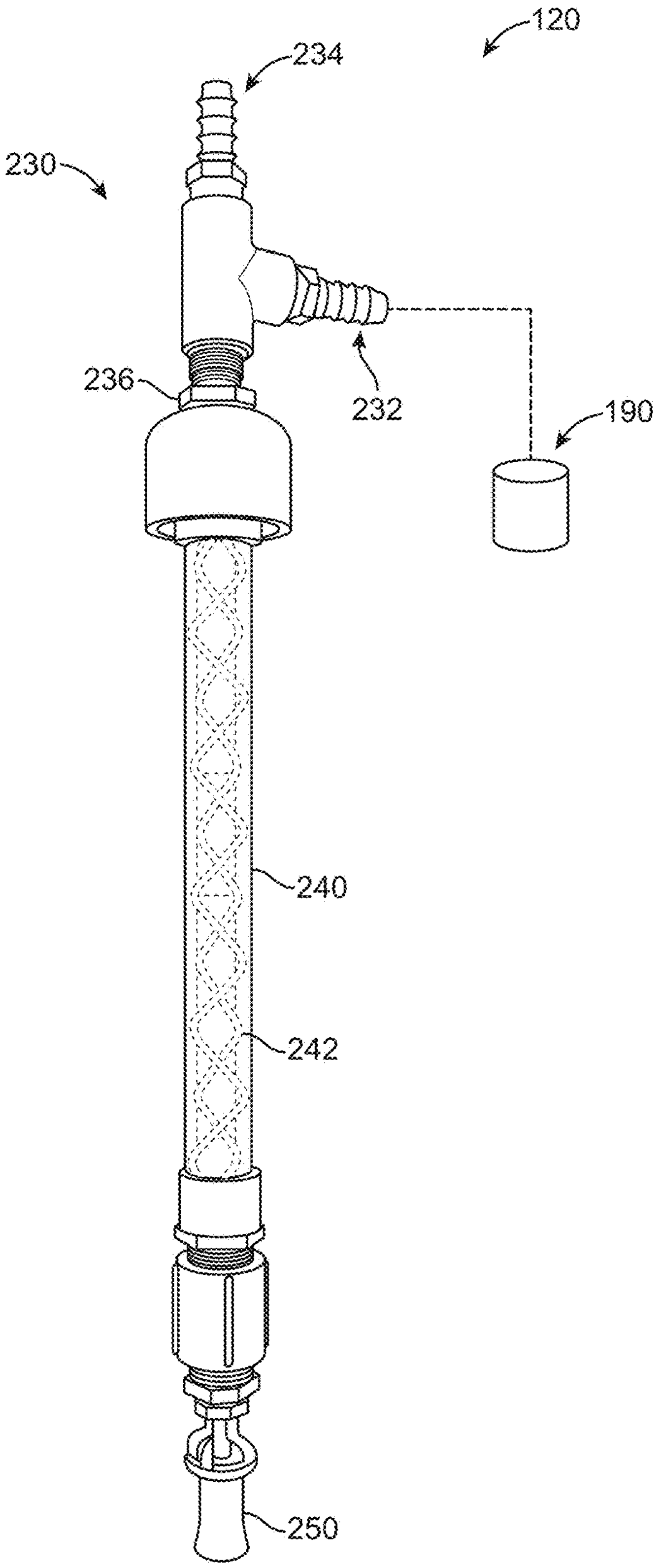
FIG. 2 is a schematic view of a mixing assembly for mixing, blending and/or diluting the adhesive as shown in FIG. 1 in accordance with an exemplary embodiment.

As shown in FIGS. 1 and 2, the mixing assembly 120 includes an adhesive pump 210, which feeds a neat adhesive from an adhesive source 190 into a first inlet 232 of a manifold arrangement 230, and the mixing pump 220, which feeds a mixture of water and adhesive through a second inlet 234 of the manifold arrangement 230. The mixture of water and adhesive (or diluted mixture) and adhesive is fed through a first outlet 236 to a static mixer 240, which mixes the diluted mixture with the adhesive. The diluted mixture and adhesive is then ejected through an eductor 250 into a lower portion of the dilution tank 110. In accordance with an exemplary embodiment, the static mixer can be a helical static mixer and/or a plate type static mixer 242.

Advantageously, the system and method as disclosed herein can provide the simultaneous injection of a neat adhesive and a diluted adhesive into the dilution tank 110, which can help improving mixing capabilities over known mixtures using. In addition, the system 100 can be configured such that a replaceable static mixer can be used to mix the adhesive and diluted adhesive during the mixing/dilution process. In accordance with an exemplary embodiment, by using a replaceable static mixer, different static mixers can be used depending on the nature of the adhesive that is being fed to the system 100.

In accordance with an exemplary embodiment, the system 100 can also be configured to mix and blend liquids other than water and an adhesive. In addition, the system 100 can be configured to receive one or more additional liquid materials via a pump or other type device. Other liquids, for example, can include inks or colored dye.

In accordance with an exemplary embodiment, the system 100 can include a Venturi style mixing device or eductor 250, for example, to continuously mix the adhesive with the diluted adhesive in the static mixer, with the diluted adhesive from the dilution tank 110.

In accordance with an exemplary embodiment, a lower end of the mixing device can be positioned in close proximity to the bottom of the dilution tank 110 to allow the diluted material to impact the bottom of the dilution tank 110, which can begin a rolling action that keeps solids from settling on the bottom of the tank 110, and continue the mixing action.

In addition, the system 100 provides the ability to increase or decrease the volume of adhesive added at the injection point prior to the static mixer, by adjusting the speed of the neat pump 210. In addition, the system 100 can be designed with replaceable mixing assembly components such that the system can be a custom designed mixing assembly 120.

In accordance with an exemplary embodiment, the dilution tank 110 can be fitted with a water spray nozzle 180, which can help maintain a clean environment inside the dilution tank 110 by using a specially designed water spray nozzle. In accordance with an exemplary embodiment, the ability to increase or decrease system capacities by varying the sizes of the pumps, tanks, water valve, water pressure regulator, means of dilute transfer (solenoid valves or pumps), vent between dilution tank 110 and feed tank 140. In accordance with an exemplary embodiment, the system 100 can maintain a clean environment inside the dilution tank by using an air filter to keep out atmospheric contaminations.

In accordance with an exemplary embodiment, the system 100 includes the ability to clean the dilution tank 110 can include a drain valve (not shown) on a lower portion, which can help provide an easy and efficient method of cleaning specific ports in the dilution tank 110.

In accordance with an exemplary embodiment, water is added to the dilution tank 110 via a spray nozzle 180 from a water source (not shown). The spray nozzle 180 can be configured to spray a wet mist into the dilution tank 110. Once the water has been added to the dilution tank 110, the neat adhesive is added to the dilution tank 110 via an adhesive pump 210 and a mixing pump 220 that is used to recirculate the water and/or dilute of water and adhesive through a static mixer while the adhesive, for example, glue is being added. In accordance with an exemplary embodiment, the water is initially added and then the neat adhesive. However, in accordance with an alternative embodiment, additional water can be added during the mixing process to the diluted water and adhesive and the neat adhesive.

In accordance with an exemplary embodiment, the system 100 can recirculate the mixture of water and adhesive in the dilute or batch tank 110 as the adhesive can be slowly added to the dilution tank 110. Once a desired amount of adhesive can be added to the water, the diluted adhesive of water and adhesive, can be discharged to the feed tank 140.

In accordance with an exemplary embodiment, the system and method can also provide faster batch times because the system mixes the dilute and adhesive while adding additional adhesive to the dilution tank (or batch tank) 110. The system can also remain a closed system since the system uses a static mixer and recirculation pump, instead of a propeller mixer that would penetrate the tank. In addition, the system 100 as disclosed has a reduced vibration from the use of a recirculation pump (instead of a propeller mixer), which can also make the batch process more accurate.

In accordance with an exemplary embodiment, the system for mixing, blending and/or diluting an adhesive can include beginning a new batch once the dilution tank 110 reaches the refill level based on a desired concentration and/or dilution within the dilution tank 110. Once the dilution level (or concentration level or consistency) has been reached, the diluted mixture of water and adhesive can be fed via a pump and/or gravity feed into the feed tank 140.

In accordance with an exemplary embodiment, the system controller 150 can be configured to identify the weight of the diluted mixture remaining in the dilution tank 110 based on the weight of the dilution tank and diluted mixture remaining in the dilution tank 110. Water can then be added via the spray nozzle 180 into the dilution tank 110 until a target volume and/or weight is reached. In accordance with an exemplary embodiment, the target volume and/or weight can be based on the strength of the adhesive and/or a ratio of water to adhesive. For example, in accordance with an exemplary embodiment, the controller 150 can identify the weight of liquid in the dilution tank 110 and convert the weight to a corresponding volume. The adhesive pump 220 and the mixing pump 230 can then be activated or energized to begin the mixing process.

In accordance with an exemplary embodiment, the adhesive pump 220 slowly brings the neat adhesive from the source of neat adhesive 190 into the mixing assembly 120. The mixing pump 220 draws the diluted adhesive, which can include water and/or diluted adhesive from the bottom of the dilution tank 110 and feeds the water and/or diluted adhesive into the mixing assembly 120. In accordance with an exemplary embodiment, the entire volume of water and/or diluted adhesive can pass through the mixing assembly more than once per minute, for example, 2 to 10 times per minute, for example, approximately five (5) times per minute.

The eductor 250 at the base of the mixing assembly 120 is also configured to help with the mixing of the diluted adhesive and the neat adhesive. As the diluted adhesive and neat adhesive, which has been mixed in the static mixture passes through the eductor 250, a Venturi effect is created, and the diluted adhesive is drawn into the eductor 250 and mixed with the dilute passing through the eductor, for example, at a ratio of about 2:1 to 10:1, and more preferably about 4:1. For example, for each gallon that passes through the eductor nozzle, 4 gallons can be drawn into the mixing assembly 120 from outside the eductor 250.

In accordance with an exemplary embodiment, the diluted adhesive exits the eductor 250 near or adjacent the bottom of the dilution tank 110, which helps the mixing or blending process. For example, when the diluted adhesive hits the bottom of the dilution tank 110, the diluted adhesive creates a rolling effect that rotates along the bottom of the tank 110 and up the sides of the tank 110. Once the adhesive target is reached, for example, the controller 150 can turn off the pumps 210, 220. In accordance with an exemplary embodiment, a dump valve (not shown) can be used to replenish the diluted mixture pulled from the dilution tank 110 into the feed tank (or process tank) 140, which can be filled with one or more batches of diluted adhesive from the dilution tank 110.

In accordance with an exemplary embodiment, the process can be repeated until the feed tank 140 is full of diluted adhesive.

While this invention has been described with reference to the preferred embodiment described above, it will be appreciated that the configuration of this invention can be varied and that the scope of this invention is defined by the following claims.

What is claimed is:

1. A method for diluting an adhesive, the method comprising:

generating a series of signals related to the weight of a dilution tank when empty and at various levels of fill, the dilution tank being of a known capacity and located upon a scale;

inputting into a system controller the series of signals from the scale relating to the weight of the dilution tank when empty and at various levels of fill with water and adhesive;

inputting into the system controller a target concentration of a diluted adhesive;

feeding water into the dilution tank from a source of water through a spray nozzle;

feeding a neat adhesive into a mixing assembly, the mixing assembly comprising:

a manifold having a first inlet configured to receive the neat adhesive from a source of neat adhesive, a second inlet configured to receive a mixture of the water and a diluted adhesive received from a lower portion of the dilution tank, and a first outlet configured to feed the neat adhesive received from the first inlet and the mixture of the water and the diluted adhesive received from the second inlet to a static mixer;

the static mixer configured to receive the mixture of the water and the diluted adhesive received from the lower portion of the dilution tank and the neat adhesive from the source of neat adhesive from the first outlet, and mix the neat adhesive and the mixture of the water and the diluted adhesive from the lower portion of the dilution tank; and an eductor configured to eject the mixture of the neat adhesive and the mixture of the water and the diluted adhesive into the lower portion of the dilution tank; and mixing the water, the neat adhesive, and the diluted adhesive until the target concentration of the diluted adhesive is reached.

2. The method of claim 1, comprising:

feeding a batch of the diluted adhesive into a feed tank once the target concentration of the diluted adhesive has been obtained.

3. The method of claim 1, comprising:

pumping the neat adhesive from the source of neat adhesive to the first inlet of the manifold arrangement.

4. The method of claim 1, comprising:

pumping the mixture of the water and the diluted adhesive received from the lower portion of the dilution tank to the second inlet of the manifold arrangement.

5. The method of claim 1, wherein the static mixer is a helical static mixer and/or a plate type static mixer.

6. The method of claim 1, wherein the source of neat adhesive is for laminating tissues and paper towels.

7. The method of claim 1, comprising:

spraying the water on an inner wall of the dilution tank.

8. The method of claim 1, comprising:

inputting a ratio of the water to the neat adhesive into the system controller; and providing instructions to the adhesive pump to add the neat adhesive until the target concentration of diluted adhesive is reached.

9. The method of claim 1, further comprising:

feeding one or more liquids into the mixing assembly, the one or more liquids being fed into the mixing assembly being inks or colored dye.

10. A method for diluting an adhesive, the method comprising:

generating a series of signals related to the weight of a dilution tank when empty and at various levels of fill, the dilution tank being of a known capacity and located upon a scale;

inputting into a system controller the series of signals from the scale relating to the weight of the dilution tank when empty and at various levels of fill with water and adhesive;

inputting into the system controller a target concentration of a diluted adhesive;

feeding water into the dilution tank from a source of water through a spray nozzle, the spray nozzle configured to spray the water on an inner wall of the dilution tank;

feeding a neat adhesive into a mixing assembly, the mixing assembly comprising:

a manifold having a first inlet configured to receive the neat adhesive from a source of neat adhesive, a second inlet configured to receive a mixture of the water and a diluted adhesive received from a lower portion of the dilution tank, and a first outlet configured to feed the neat adhesive received from the first inlet and the mixture of the water and the diluted adhesive received from the second inlet to a static mixer;

the static mixer configured to receive the mixture of the water and the diluted adhesive received from the lower portion of the dilution tank and the neat adhesive from the source of neat adhesive from the first outlet, and mix the neat adhesive and the mixture of the water and the diluted adhesive from the lower portion of the dilution tank; and an eductor configured to eject the mixture of the neat adhesive and the mixture of the water and diluted adhesive into the lower portion of the dilution tank; and mixing the water, the neat adhesive, and the diluted adhesive until the target concentration of the diluted adhesive is reached.

11. The method of claim 10, wherein the source of the neat adhesive is for laminating tissues and paper towels, the method further comprising:

inputting a ratio of the water to the neat adhesive into the system controller; and providing instructions to the adhesive pump to add the neat adhesive until the target concentration of the diluted adhesive is reached.

* * * * *